(12) United States Patent
Fiveland

(10) Patent No.: US 7,418,928 B2
(45) Date of Patent: Sep. 2, 2008

(54) ENGINE AND METHOD FOR OPERATING AN ENGINE

(75) Inventor: Scott B. Fiveland, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/412,812

(22) Filed: Apr. 28, 2006

(65) Prior Publication Data

US 2007/0251472 A1 Nov. 1, 2007

(51) Int. Cl.
*F02B 75/02* (2006.01)
(52) U.S. Cl. .......................... 123/64; 123/37
(58) Field of Classification Search ............ 123/37, 123/64, 568.14
See application file for complete search history.

(56) References Cited

U.S. PATENT DOCUMENTS

| | | | | |
|---|---|---|---|---|
| 2,249,997 | A | * | 7/1941 | Wydler ..................... 123/64 |
| 3,709,201 | A | | 1/1973 | Cook |
| 3,964,263 | A | * | 6/1976 | Tibbs ....................... 123/64 |
| 4,143,518 | A | | 3/1979 | Kellogg-Smith |
| 4,237,832 | A | | 12/1980 | Hartig et al. |
| 4,289,097 | A | | 9/1981 | Ward |
| 4,367,700 | A | | 1/1983 | Pace |
| 4,641,613 | A | | 2/1987 | Delesalle |
| 4,736,715 | A | | 4/1988 | Larsen |
| 4,878,464 | A | | 11/1989 | Richeson, Jr. et al. |
| 4,917,054 | A | | 4/1990 | Schmitz |
| 4,945,870 | A | | 8/1990 | Richeson |
| 5,131,354 | A | | 7/1992 | Richeson |
| 5,284,116 | A | | 2/1994 | Richeson, Jr. |
| 5,542,382 | A | | 8/1996 | Clarke |
| 5,699,758 | A | | 12/1997 | Clarke |
| 5,732,677 | A | | 3/1998 | Baca |
| 6,205,963 | B1 | | 3/2001 | Davies |

(Continued)

FOREIGN PATENT DOCUMENTS

DE  199 05 364 C1  8/2000

OTHER PUBLICATIONS

"Six-Cycle Oddball Engine," printed from Internet on Feb. 23, 2006.

(Continued)

*Primary Examiner*—Noah Kamen
(74) *Attorney, Agent, or Firm*—Finnegan, Henderson, Farabow, Garrett & Dunner

(57) ABSTRACT

A method of operating an engine is provided. The engine may have a housing with one or more combustion chambers, including a first combustion chamber. The engine may also have a piston in fluid communication with the first combustion chamber. The method may include combusting fuel in the first combustion chamber, thereby producing combustion gas that expands and drives the piston during a first combustion-gas-expansion stroke of the piston. The method may also include compressing at least part of the combustion gas in the first combustion chamber during a compression stroke of the piston. Additionally, the method may include, between commencement of the first combustion-gas-expansion stroke and completion of the compression stroke, releasing part of the combustion gas from the first combustion chamber. The method may also include, subsequent to completion of the compression stroke, expanding at least part of the combustion gas against the piston during an additional combustion-gas-expansion stroke of the piston.

18 Claims, 2 Drawing Sheets

U.S. PATENT DOCUMENTS

| | | |
|---|---|---|
| 6,253,745 B1 | 7/2001 | Prater |
| 6,257,176 B1 | 7/2001 | Shimasaki et al. |
| 6,286,466 B1 | 9/2001 | Braun et al. |
| 6,443,108 B1 | 9/2002 | Brehob et al. |
| 6,523,504 B2 | 2/2003 | Miura |
| 6,564,758 B1 * | 5/2003 | Enderle et al. ............... 123/64 |
| 6,619,241 B2 | 9/2003 | Otterspeer et al. |
| 6,640,756 B2 | 11/2003 | Ogiso |
| 6,659,083 B2 | 12/2003 | Gaessler et al. |
| 6,758,174 B1 | 7/2004 | Fuehapter |
| 6,776,144 B1 | 8/2004 | Newman |
| 6,938,598 B1 * | 9/2005 | Lewis et al. ............... 123/179.1 |
| 6,966,309 B1 | 11/2005 | Roberts, Jr. et al. |
| 7,080,613 B2 * | 7/2006 | Kuo et al. ............... 123/64 |
| 2006/0005788 A1 * | 1/2006 | Kuo et al. ............... 123/64 |
| 2007/0044778 A1 | 3/2007 | Milovanovic et al. |

OTHER PUBLICATIONS

PCT International Search Report; File Ref. No.: 05-886; International Application No.: PCT/US2007/006486; Filing Date: Mar. 14, 2007; Priority Date: Apr. 28, 2006; Applicant: Caterpillar Inc.

* cited by examiner

ENGINE AND METHOD FOR OPERATING AN ENGINE

TECHNICAL FIELD

The present disclosure relates to engines and methods for operating engines.

BACKGROUND

Many systems use engines to produce power for performing various tasks. Engines often produce power by executing a power cycle that includes introducing fuel and air into a combustion chamber and combusting the fuel with the air in the combustion chamber to produce high-pressure combustion gas that expands in the combustion chamber and drives a working member, such as a piston. In many cases, the power cycle that an engine executes includes releasing the combustion gas from the combustion chamber to accommodate introduction of new fuel and air into the combustion chamber during a subsequent power cycle. Often, the engine releases the combustion gas from the combustion chamber after it has expanded once. Unfortunately, releasing the combustion gas from the combustion chamber this quickly may have undesirable results. For example, releasing combustion gas from the combustion chamber after expanding the combustion gas only once may substantially reduce the temperature and pressure of the combustion gas before hydrocarbon particles in the combustion gas have significant time to regenerate.

U.S. Pat. No. 6,443,108 to Brehob et al. ("the '108 patent") shows an engine that executes a power cycle that includes retaining combustion gas in a combustion chamber after the combustion gas has expanded once. The power cycle disclosed by the '108 patent includes an intake stroke wherein an intake valve is open as a piston of the engine moves in a direction that increases the volume of the combustion chamber so that air fills the combustion chamber. Subsequently, the engine closes the intake valve and holds an exhaust valve closed so that the combustion chamber is closed while the piston compresses the air during a compression stroke. With the intake valve and exhaust valve still closed, the engine of the '108 patent then combusts fuel in the combustion chamber, producing combustion gas that drives the piston through a first expansion stroke.

The engine then holds the intake and exhaust valve closed while the piston compresses the combustion gas in the combustion chamber during a second compression stroke and the combustion gas expands and drives the working member through a second expansion stroke. The '108 patent also discloses that the engine may combust additional fuel in the combustion chamber during the second compression stroke and/or the second expansion stroke. After the second expansion stroke, the engine of the '108 patent opens the exhaust valve so that the piston drives the combustion gas out of the combustion chamber during an exhaust stroke.

Although the engine of the '108 patent executes a power cycle that includes retaining the combustion gas in the combustion chamber after it expands once, certain disadvantages persist. For example, retaining all of the combustion gas in the combustion chamber during the second compression stroke and the second expansion stroke may result in very high temperatures and pressures in the combustion chamber during these phases of operation. This may be especially so because the engine of the '108 patent combusts additional fuel in the combustion chamber during the second compression stroke and/or the second expansion stroke. Very high temperatures and pressures in the combustion chamber during the second compression stroke and the second expansion stroke may create a number of undesirable results, such as high production of $NO_x$ and high stress on the components of the engine.

The engine and methods of the present disclosure solve one or more of the problems set forth above.

SUMMARY OF THE INVENTION

One disclosed embodiment relates to a method of operating an engine having a housing with one or more combustion chambers, including a first combustion chamber. The engine may also have a piston in fluid communication with the first combustion chamber. The method may include combusting fuel in the first combustion chamber, thereby producing combustion gas that expands and drives the piston during a first combustion-gas-expansion stroke of the piston. The method may further include compressing at least part of the combustion gas in the first combustion chamber during a compression stroke of the piston. Additionally, the method may include, between commencement of the first combustion-gas-expansion stroke and completion of the compression stroke, releasing part of the combustion gas from the first combustion chamber. The method may also include expanding at least part of the combustion gas against the piston during an additional combustion-gas-expansion stroke of the piston.

Another embodiment relates to an engine having a housing with one or more combustion chambers, including a first combustion chamber. The engine may further include a working member disposed at least partially in the housing. Additionally, the engine may include engine controls operable to cause a power cycle in the first combustion chamber. The power cycle may include combustion of fuel in the first combustion chamber, producing combustion gas that expands against and drives the working member a first time. The power cycle may also include release of a first portion of the combustion gas from the first combustion chamber. Additionally, the power cycle may include compression of at least a portion of the combustion gas in the first combustion chamber. The power cycle may include expansion of at least a portion of the combustion gas against the working member again, whereby the working member is driven by that portion of the combustion gas again.

A further embodiment relates to a method of operating an engine. The engine may have a housing with one or more combustion chambers, including a first combustion chamber. The engine may also include a working member. The method may include executing a power cycle in the first combustion chamber. Executing the power cycle in the first combustion chamber may include combusting fuel in the first combustion chamber, thereby producing combustion gas that expands against and drives the working member. The method may also include releasing a first portion of the combustion gas from the first combustion chamber. Additionally, the method may include compressing at least a portion of the combustion gas in the first combustion chamber. The method may also include expanding at least a portion of the combustion gas in the first combustion chamber against the working member again, whereby the working member is driven again by that portion of the combustion gas.

DETAILED DESCRIPTION

Figure 1:
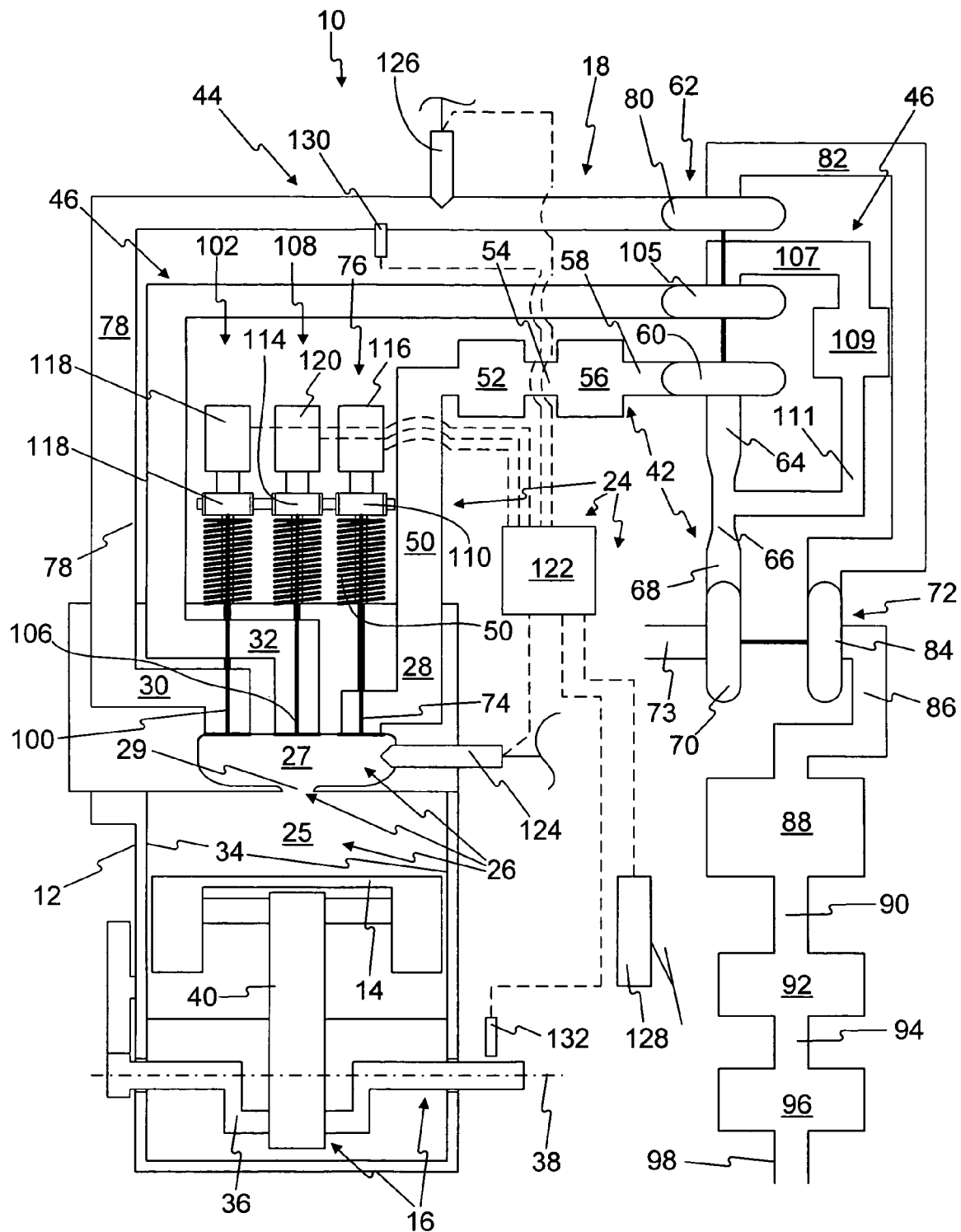
FIG. 1 is a schematic illustration of one embodiment of an engine according to the present disclosure.

FIG. 1 illustrates an engine 10 according to the present disclosure. Engine 10 may include a housing 12, a working member 14, a power-transfer system 16, an aspiration system 18, and engine controls 24.

Housing 12 may include a combustion chamber 26 and passages 28, 30, 32 extending from combustion chamber 26 to openings in the exterior surface of housing 12. In some embodiments, combustion chamber 26 may include a first portion 25, a second portion 27, and a necked portion 29 with a reduced cross-section between first and second portions 25, 27. Additionally, as FIG. 1 shows, in some embodiments, passages 28, 30, 32 may extend from second portion 27 of combustion chamber 26. In some embodiments, housing 12 may also include a channel 34 extending from first portion 25 of combustion chamber 26. Channel 34 may be, for example, a cylinder. As FIG. 1 shows, housing 12 may be constructed of multiple pieces fastened together. Alternatively, housing 12 may have a one-piece construction.

Working member 14 and power-transfer system 16 may be supported at least partially within housing 12. Working member 14 may be any type of component configured to be driven by combustion in combustion chamber 26. As FIG. 1 shows, working member 14 may be a piston disposed adjacent first portion 25 of combustion chamber 26 and at least partially within channel 34 in such a manner that it may slide along the axis of channel 34. As FIG. 1 shows, in some embodiments, channel 34 and working member 14 may have cross-sections substantially larger than necked portion 29 of combustion chamber 26. Power-transfer system 16 may be composed of any component or components configured to mechanically transfer power from working member 14 to one or more other components. In some embodiments, power-transfer system 16 may include a rotary output member 36 and a connecting linkage 40 connecting working member 14 to rotary output member 36 in such a manner that sliding of working member 14 in channel 34 causes rotation of rotary output member 36 about an axis 38 and vice versa. For example, as FIG. 1 shows, rotary output member 36 and connecting linkage 40 may be a conventional crankshaft and connecting rod. Alternatively, rotary output member 36 and connecting linkage 40 may have various other constructions for converting linear motion of working member 14 into rotation of rotary output member 36.

The general configuration of engine 10 is not limited to that shown in FIG. 1. Combustion chamber 26 may have a different configuration than that shown in FIG. 1. Also, in addition to combustion chamber 26 and passages 28, 30, 32, housing 12 may include other combustion chambers and additional passages connected between those combustion chambers and openings in the exterior surface of housing 12. Similarly, engine 10 may include additional working members and additional connecting linkages connecting those additional working members to rotary output member 36. Additionally, engine 10 may have a significantly different configuration of housing 12, working member 14, and power-transfer system 16. For example, in some embodiments, engine 10 may be a Wankel-type rotary engine with working member 14 being a rotor, a sliding-vane-type engine with working member 14 being one of the sliding vanes, or any other type of engine having a working member configured to be driven by combustion. Additionally, in some embodiments, engine 10 may omit power-transfer system 16 and transfer power from working member 14 to other components directly or through means other than a mechanical connection.

Aspiration system 18 may include a charge-gas-intake system 42, an exhaust system 44, and a combustion-gas-recirculation system 46. Charge-gas-intake system 42 may be configured to deliver air, and in some cases other gases, to combustion chamber 26. Charge-gas-intake system 42 may include passage 28, a passage 50, a charge-gas cooler 52, a passage 54, a charge-gas cooler 56, a passage 58, a compressor unit 60 of a turbocharger 62, a passage 64, a combustion-gas-induction device 66, a passage 68, a compressor unit 70 of a turbocharger 72, and a passage 73. Combustion-gas-induction device 66 may be any kind of device configured to create a localized region of reduced pressure in charge-gas-intake system 42 so that combustion gas may flow from combustion-gas-recirculation system 46 into charge-gas-intake system 42. For example, combustion-gas-induction device 66 may be a venturi or an eductor.

Exhaust system 44 may be configured to direct gas from combustion chamber 26 to the atmosphere. Exhaust system 44 may include passage 30, a passage 78, a turbine unit 80 of turbocharger 62, a passage 82, a turbine unit 84 of turbocharger 72, a passage 86, an oxidation catalyst 88, a passage 90, a three-way catalyst 92, a passage 94, a particulate trap 96, and a passage 98.

Combustion-gas-recirculation system 46 may be any component or system of components configured to direct gas from combustion chamber 26 into charge-gas-intake system 42 and/or other combustion chambers (not shown) of engine 10. Combustion-gas-recirculation system 46 may include passage 32, a passage 104, a second turbine unit 105 of turbocharger 62, a passage 107, a combustion-gas cooler 109, a passage 111, and combustion-gas-induction device 66. Combustion-gas-recirculation system 46 may additionally or alternatively include one or more passages extending from combustion chamber 26 to one or more other combustion chambers of engine 10. In some embodiments, the passages of combustion-gas-recirculation system 46 may be integrally formed in housing 12.

In addition to the above-discussed components, charge-gas-intake system 42, exhaust system 44, and combustion-gas-recirculation system 46 may include valves 74, 100, 106, respectively, and valve-operating systems 76, 102, and 108, respectively. Valves 74, 100, 106 and valve-operating systems 76, 102, 108 may include any components operable to coordinate flow of gas between combustion chamber 26 and the various portions of aspiration system 18 in the manners described herein below. In some embodiments valves 74, 100, 106 may be poppet valves, and valve-operating systems 76, 102, 108 may be operable to control the position of valves 74, 100, 106. In such embodiments, valve-operating systems 76, 102, 108 may include various combinations of one or more different kinds of actuators, including, but not limited to, mechanical actuators, hydraulic actuators, and electrical actuators. For example, as FIG. 1 shows, each valve-operating system 76, 102, 108 may include a mechanical valve-actuating system 110, 112, 114 drivingly connected to power-transfer system 16 and configured to control operation of valves 74, 100, 106 as a function of motion of power-transfer system 16 and working member 14.

Additionally, in some embodiments, one or more of valve-operating systems 76, 102, 108 may include provisions for controlling one or more aspects of the operation of valves 74, 100, 106 independently of motion of power-transfer system 16 and working member 14. For example, in addition to mechanical valve-actuating systems 110, 112, 114, valve-operating systems 76, 102, 108 may include valve actuators 116, 118, 120, which may be, for example, hydraulic and/or electric actuators. Each valve actuator 116, 118, 120 may be operable when actuated to cause valves 74, 100, 106 to be open to a greater or lesser extent than mechanical valve-actuating system 110, 112, 114 would by itself. For example, a valve actuator 116, 118, 120 may be actuated to alter the closing time of the associated intake valve 74, 100, 106 by holding the intake valve 74, 100, 106 open longer than the associated mechanical valve-actuating system 110, 112, 114 would. In some embodiments, a valve actuator 116, 118, 120 may not be operable to open a valve 74, 100, 106, just to hold it open after the associated mechanical valve-actuating system 110, 112, 114 opens it. In such embodiments, valve actuators 116, 118, 120 may be operable to adjust the closing time, but not the opening time of valves 74, 100, 106.

The provisions of engine 10 for controlling flow of fluid between combustion chamber 26 and aspiration system 18 are not limited to the configurations shown in FIG. 1 and discussed above. For example, one or more of valves 74, 100, 106 may be of a type other than a poppet valve. Additionally, engine 10 may include multiple valves in place of any one of valves 74, 100, 106. Furthermore, one or more of valve-operating systems 76, 102, 108 may be operable to control the associated intake valve 74, 100, 106 completely independently of motion of power-transfer system 16 and working member 14. Conversely, one or more of valve-operating systems 76, 102, 108 may be operable to control the associated intake valve 74, 100, 106 exclusively as a function of motion of power-transfer system 16 and working member 14.

Additionally, aspiration system 18, generally, is not limited to the configuration shown in FIG. 1. For example, aspiration system 18 may include other turbochargers in addition to turbochargers 62, 72, or aspiration system 18 may omit one or both of turbochargers 62, 72. Additionally, charge-gas-intake system 42 may omit one or more of the components shown in FIG. 1 and/or include additional components not shown in FIG. 1, such as one or more filters, throttles, and/or drains. Similarly, exhaust system 44 may omit one or more of the components shown in FIG. 1 and/or include components not shown in FIG. 1, such as mufflers, wastegates for turbochargers 62, 72, and/or exhaust brakes.

Engine controls 24 may include valves 74, 100, 106, valve-operating systems 76, 102, 108, a fuel-metering system, a controller 122, and various sources of information for controller 122. The fuel-metering system may include a fuel-metering device 124 configured to meter fuel delivered to combustion chamber 26 and a fuel-metering device 126 configured to meter fuel into passage 78 of exhaust system 44. Each fuel-metering device 124, 126 may be connected to a fuel supply (not shown). As FIG. 1 shows, in some embodiments, fuel-metering device 124 may be a fuel injector operable to inject fuel directly into combustion chamber 26. Similarly, fuel-metering device 126 may be a fuel injector configured to inject fuel directly into passage 78 of exhaust system 44. Each fuel-metering device 124, 126 may be configured to be operated mechanically, hydraulically, electrically, magnetically, and/or through any other suitable means.

Controller 122 may be an information-processing device operable to control one or more aspects of the operation of one or more components of engine 10. Controller 122 may include one or more processors (not shown) and one or more memory devices (not shown). Controller 122 may be operatively connected to valve actuators 116, 118, 120 and fuel-metering devices 124, 126, so that controller 122 may exercise control over one or more aspects of their operation. Additionally, controller 122 may be operatively connected to various sources of information that controller 122 can use in controlling valve actuators 116, 118, 120 and fuel-metering devices 124, 126.

The sources of information that controller 122 is operatively connected to may include an operator interface 128, a sensor 130, and a sensor 132. Operator interface 128 may be configured to provide controller 122 with various information relating to how an operator desires engine 10 to operate. For example, operator interface 128 may provide controller 122 with information relating to an operating speed and/or power output desired by an operator. Sensor 130 may be configured to provide controller 122 with information relating to the speed and/or position of rotary output member 36. This information may be useful to allow controller 122 to properly time various events, such as delivery of fuel into combustion chamber 26. Sensor 132 may be operable to provide controller 122 with information relating to the concentration of oxygen inside passage 78 of exhaust system 44.

Engine controls 24 are not limited to the configuration shown in FIG. 1. For example, fuel-metering device 124 may be configured to deliver fuel into charge-gas-intake system 42, rather than directly into combustion chamber 26. Additionally, in some embodiments, fuel-metering device 124 may be a type of device other than a fuel injector, such as a carburetor. Furthermore, in some embodiments, the fuel-metering system may omit fuel-metering device 126. Additionally, in some embodiments, engine controls 24 may include a spark-ignition system for initiating combustion of fuel in combustion chamber 26. Moreover, in addition to, or in place of, controller 122, engine controls 24 may include other information-processing systems, including, but not limited to, other controllers, hardwired-information processing circuits, hydraulic information-processing systems, pneumatic information-processing systems, and mechanical information-processing systems.

INDUSTRIAL APPLICABILITY

Engine 10 may have application wherever power is required to perform one or more tasks. Engine controls 24 may be operable to cause engine 10 to produce power by causing a succession of power cycles in combustion chamber 26. Each power cycle in combustion chamber 26 may include introduction of charge gas and fuel, combustion of the fuel with the charge gas to produce combustion gas that drives working member 14, and release of at least part of the combustion gas from the combustion chamber to accommodate introduction of new charge gas in the next power cycle.

Figure 2A:
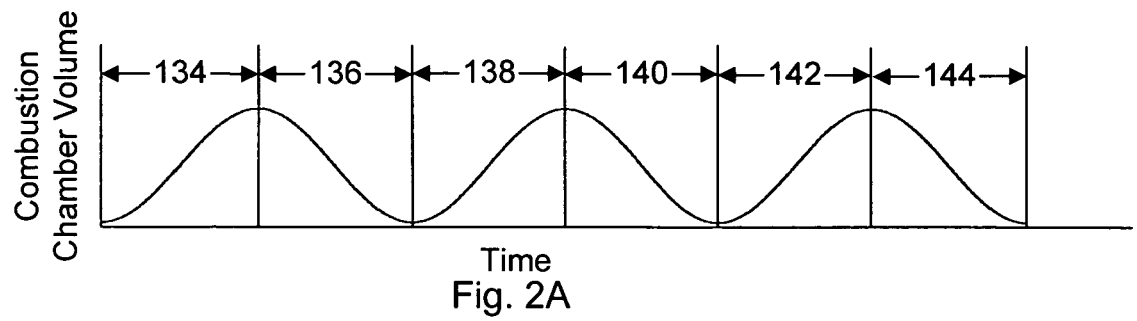
FIG. 2A is a graphical illustration of motion of a working member of an engine over a period of time.
Figure 2B:
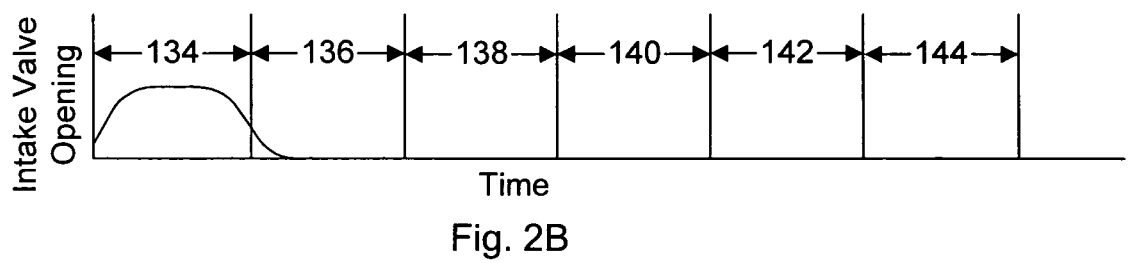
FIG. 2B is a graphical illustration of operation of an intake valve of an engine over the same period of time shown in FIG. 2A.
Figure 2C:
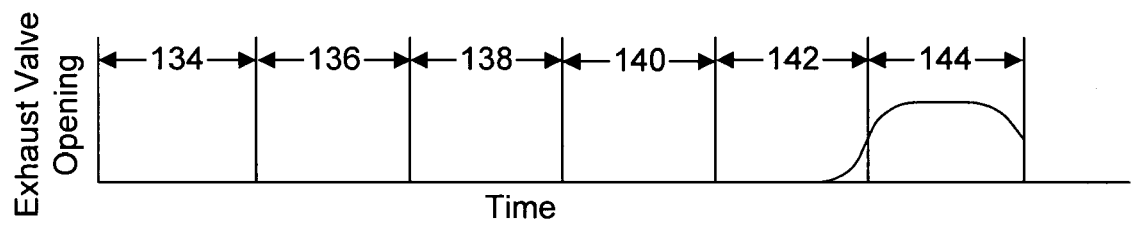
FIG. 2C is a graphical illustration of operation of an exhaust valve of an engine over the same period of time shown in FIG. 2A.
Figure 2D:
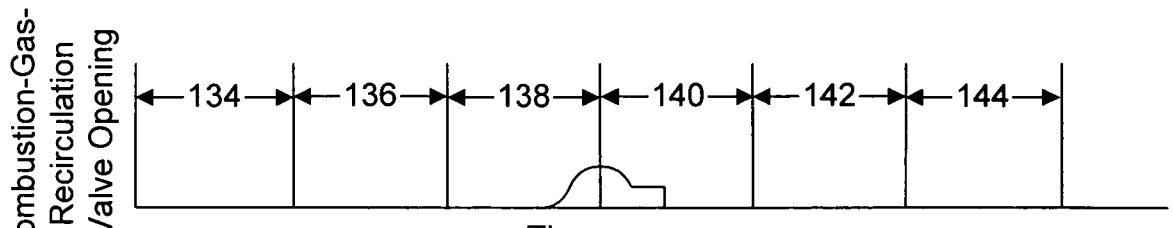
FIG. 2D is a graphical illustration of operation of a combustion-gas-recirculation valve of an engine over the same period of time shown in FIG. 2A.

FIGS. 2A-2E graphically illustrate one embodiment of a method according to which engine controls 24 may operate to cause one embodiment of a power cycle according to the present disclosure in combustion chamber 26. FIG. 2A shows the variation in volume of combustion chamber 26 as working member 14 reciprocates three times within channel 34. FIGS. 2B-2D graphically illustrate operation of intake valve 74, exhaust valve 100, and combustion-gas-recirculation valve 106, respectively, over the course of the same time period covered by FIG. 2A. Finally, FIG. 2E graphically illustrates the introduction of fuel into combustion chamber 26 by fuel-metering device 124 during the same time period illustrated in FIGS. 2A-2D. The phases of the power cycle shown in FIGS. 2A-2E may include an intake stroke 134, a first compression stroke 136, a first combustion-gas-expansion stroke 138, a second compression stroke 140, a second combustion-gas-expansion stroke 142, and an exhaust stroke 144.

During intake stroke 134, valve-operating system 76 may cause intake valve 74 to be open so that charge gas may enter combustion chamber 26 from charge-gas-intake system 42. The charge gas may include air directed from the atmosphere through charge-gas-intake system 42. Additionally, the charge gas may include various other gases, such as combustion gas from other power cycles of engine 10.

Close to the end of intake stroke 134, valve-operating system 76 may close intake valve 74, substantially sealing combustion chamber 26. Accordingly, working member 14 may compress the charge gas in combustion chamber 26 during first compression stroke 136, thereby substantially increasing the temperature and pressure of the charge gas. In embodiments where combustion chamber 26 includes first portion 25, second portion 27, and necked portion 29, during first compression stroke 136, working member 14 may reduce the volume in first portion 25 of combustion chamber 26. By doing so, working member 14 may drive some of the charge gas from first portion 25 of combustion chamber 26, through necked portion 29, into second portion 27. Because of the reduced cross-section of necked portion 29, the charge gas may have relatively high velocity as it flows through necked portion 29 into second portion 27 during first compression stroke 136. Additionally, the charge gas flowing into second portion 27 of combustion chamber 26 may create relatively large amounts of turbulence as it disperses in numerous directions upon entering second portion 27 of combustion chamber 26. These conditions may carry over into first combustion-gas-expansion stroke 138.

Figure 2E:
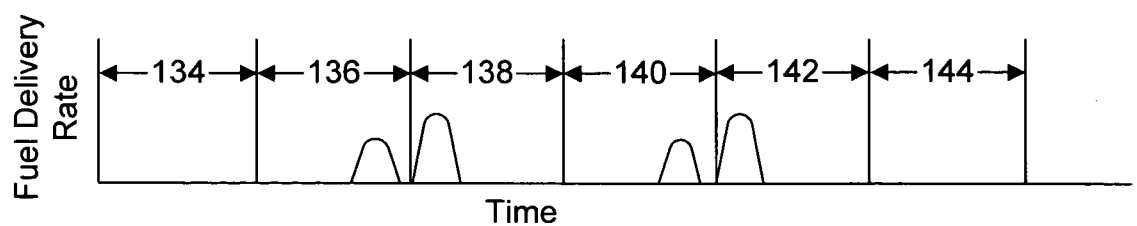
FIG. 2E is a graphical illustration of delivery of fuel into a combustion chamber over the same period of time shown in FIG. 2A.

As FIG. 2E shows, fuel-metering device 124 may introduce fuel into combustion chamber 26 during and/or shortly after first compression stroke 136. This fuel may combust with the charge gas in the combustion chamber 26, producing combustion gas having a significantly higher pressure and temperature than the charge gas had prior to combustion of the fuel. Dependent upon a number of factors, including the physical configuration of engine 10, the closing time of intake valve 74, and the timing of fuel delivery into combustion chamber 26, combustion of the fuel may occur in a number of different ways. In some embodiments of engine 10, working member 14 may compress the charge gas in combustion chamber 26 to a sufficient extent to cause combustion of this fuel by compression ignition. In other embodiments, combustion of the fuel may be initiated with spark ignition. Additionally, if the fuel is introduced into combustion chamber 26 early in first compression stroke 136, the fuel may mix with the charge gas before igniting, resulting in homogeneous-charge combustion. Alternatively, if the fuel is introduced into combustion chamber 26 relatively late in first compression stroke 136, stratified-charge combustion may occur, wherein the fuel combusts before it mixes with the charge gas in combustion chamber 26.

During much of first combustion-gas-expansion stroke 138, valve-operating systems 76, 102, 108 may maintain all of valves 74, 100, 106 closed so that combustion chamber 26 is substantially sealed. Accordingly, during first combustion-gas-expansion stroke 138, the combustion gas in combustion chamber 26 expands against and drives working member 14.

As FIG. 2D shows, at some point during combustion-gas-expansion stroke 138 and/or during second compression stroke 140, engine controls 24 may open combustion-gas-recirculation valve 106 and release a portion of the combustion gas from combustion chamber 26 into passage 104 of combustion-gas-recirculation system 46. Combustion-gas-recirculation system 46 and charge-gas-intake system 42 may recirculate the portion of the combustion gas released from combustion chamber 26 by combustion-gas-recirculation valve 106 through one or more subsequent power cycles in combustion chamber 26 and/or other combustion chambers (not shown) of engine 10.

Engine controls 24 may open combustion-gas-recirculation valve 106 in such a manner that a significant portion of the combustion gas is retained in combustion chamber 26 through the end of second compression stroke 140. For example, in some embodiments, engine controls 24 may open combustion-gas-recirculation valve 106 briefly, close to the end of first combustion-gas-expansion stroke 138. In some embodiments, engine controls 24 may open combustion-gas-recirculation valve 106 subsequent to completion of the first half of first combustion-gas-expansion stroke 138 and close combustion-gas-recirculation valve 106 prior to the second half of second compression stroke 140. Simultaneously, engine controls 24 may hold valves 72, 100 closed during at least the first half of first combustion-gas-expansion stroke 136 and the second half of second compression stroke 140. In addition to helping retain some of the combustion gas in combustion chamber 26, holding valves 72, 100, 106 closed during the first half of first combustion-gas-expansion stroke 136 may help ensure that working member 14 extracts ample energy from the expanding combustion gas.

During second compression stroke 140, working member 14 may compress the combustion gas retained in combustion chamber 26. Because of the reduced cross-section of necked portion 29 of combustion chamber 26, combustion gas entering second portion 27 from necked portion 29 may have relatively high velocity and may also cause significant turbulence in second portion 27 of combustion chamber 26. These conditions may carry over into second combustion-gas-expansion stroke 142. As working member 14 compresses the combustion gas during second compression stroke 140, the increasing heat and pressure in the combustion gas may cause active regeneration of hydrocarbon and soot particles in the combustion gas. Additionally, releasing a portion of the combustion gas into combustion-gas-recirculation system 46 as described above may prevent the combustion gas retained in combustion chamber 26 from reaching undesirably high pressures and temperatures during second compression stroke 140. This may prevent various undesirable effects, such as undesirably high production of $NO_x$ in the combustion gas and undesirably high stress on the components of engine 10.

Releasing combustion gas from combustion chamber 26 may involve a balance between releasing enough of the combustion gas to prevent undesirably high pressure and temperature during second compression stroke 140 and retaining enough of the combustion gas to ensure sufficient pressure and temperature during second compression stroke 140 to achieve desirable results, such as active regeneration of hydrocarbon particles and/or successful ignition of fuel. Engine controls 24 may achieve a desirable balance between these objectives in part by controlling valves 72, 100, 106 in such a manner that second compression stroke 140 has a desirable effective compression ratio. For example, in some embodiments, engine controls 24 may control valves 72, 100, 106 in a manner to cause the effective compression ratio of second compression stroke 140 to be between about 8:1 and about 20:1.

Engine controls 24 may control the effective compression ratio of second compression stroke 140 in various ways. In some embodiments and/or circumstances, engine controls 24 may be operable to control the effective compression ratio of second compression stroke 140 by using valve actuator 120 to delay the closing of valve 106 from the time at which mechanical valve-actuation system 114 would close valve 106. In such embodiments and/or circumstances, by controlling the closing time of valve 106 with valve actuator 120, engine controls 24 may be operable to cause second compression stroke 140 to have any value within a continuous range.

In addition to operation of valves 72, 100, 106, various other factors may affect the balance between releasing enough of the combustion gas from combustion chamber 26 and retaining enough of the combustion gas in combustion chamber 26. This is so partially because various factors other than the effective compression ratio of second compression stroke 140 affect the temperatures and pressures in combustion chamber 26 during second compression stroke 140. These factors may include, but are not limited to, the temperature, pressure, and composition of charge gas introduced into combustion chamber 26 during intake stroke 134, the closing time of intake valve 74, the amount of fuel combusted in combustion chamber 26 prior to the end of first combustion-gas-expansion stroke 138, the amount of fuel combusted in combustion chamber 26 during second compression stroke 140 and second combustion-gas-expansion stroke 142, the temperature of engine 10, and the operating speed of engine 10. Additionally, the temperatures and pressures that are most desirable in combustion chamber 26 during second compression stroke 140 may depend on various conditions relating to the operation of engine 10, such as, for example, inputs from operator interface 128 and/or the temperature of three-way catalyst 92.

Accordingly, in embodiments where engine controls 24 can control one or more of valves 72, 100, 106 at least partially independently of motion of working member 14, engine controls 24 may control one or more of valves 72, 100, 106 in a manner to control release of combustion gas from the combustion chamber dependent at least partially upon factors such as those mentioned above. For example, engine controls 24 may control valve 106 and, thereby, the effective compression ratio of second compression stroke 140 dependent upon factors such as those mentioned above. In embodiments and/or circumstances where engine controls 24 open combustion-gas-expansion valve 106 only once and hold valves 72, 100 closed during second compression stroke 140, engine controls 24 may control the effective compression ratio of second compression stroke 140 by controlling when during second compression stroke 140 combustion-gas-recirculation valve 106 closes.

As FIG. 2E shows, engine controls 24 may also introduce additional fuel into combustion chamber 26 during second compression stroke 140, which additional fuel may combust, thereby further facilitating active regeneration of hydrocarbon particles. Combustion of fuel introduced during second compression stroke 140 may be initiated by compression ignition or spark ignition and may take the form of homogeneous charge combustion or stratified charge combustion.

After second compression stroke 140, engine controls 24 may cause all three valves 74, 100, 106 to be closed during an initial portion of second combustion-gas-expansion stroke 142 so that the combustion gas expands against and drives working member 14 again. Engine controls 24 may also introduce additional fuel into combustion chamber 26 during second combustion-gas-expansion stroke 142, which fuel may combust, thereby increasing the work done on working member 14 and also facilitating further active regeneration of hydrocarbon particles. As with combustion of fuel introduced during other phases of the power cycle, combustion of fuel introduced into combustion chamber 26 during second combustion-gas-expansion stroke 142 may occur in any suitable manner.

Engine controls 24 may open exhaust valve 100 close to the end of second combustion-gas-expansion stroke 142 and hold exhaust valve 100 open for much or all of exhaust stroke 144 so that working member 14 may drive the combustion gas from combustion chamber 26 into exhaust system 44. The combustion gas released into exhaust system 44 may flow through oxidation catalyst 88, three-way catalyst 92, and particulate trap 96 to the atmosphere.

In some embodiments, engine controls 24 may operate in a manner to ensure that the combustion gas flowing through exhaust system 44 has been subjected to substantially stoichiometric combustion before it reaches three-way catalyst 92. Engine controls 24 may achieve this result in part by delivering fuel to combustion chamber 26 in a manner estimated to consume substantially all oxygen therein. To do so, controller 122 may use various information, including information from sensor 132 relating to the oxygen content of combustion gas in passage 78 from prior power cycles. As FIG. 2E shows, engine controls 24 may cause gradual consumption of the oxygen in combustion chamber 26 by combusting fuel in combustion chamber 26 at various times over the course of the power cycle. Alternatively, engine controls 24 may operate in a manner estimated to provide substantially stoichiometric combustion close to the beginning of first combustion-gas-expansion stroke 138. Controller 122 may also receive information from sensor 132 relating to the oxygen content in the combustion gas in passage 78 and cause fuel metering-device 126 to introduce additional fuel into passage 78 as necessary to consume remaining oxygen in the combustion gas before it reaches three-way catalyst 92.

Oxidation catalyst 88 may further help ensure that substantially all oxygen is consumed from the combustion gas before it reaches three-way catalyst 92. Ensuring that substantially all oxygen has been consumed from the combustion gas in exhaust system 44 before it reaches three-way catalyst 92 may promote effective conversion of $NO_x$ by three-way catalyst 92.

Constructing combustion chamber 26 with necked portion 29 between first portion 25 and second portion 27 may also provide performance benefits. As discussed above, the relatively small cross-section of necked portion 29 may cause relatively high gas velocities and turbulence in second portion 27 of combustion chamber 26 during first compression stroke 136 and second compression stroke 140. This may promote desirable mixing of gas, fuel, and hydrocarbon particles in combustion chamber 26, which may promote successful realization of stoichiometric combustion and regeneration of hydrocarbon particles in combustion chamber 26.

Operation of engine 10 is not limited to repeated execution of the configuration of power cycle illustrated in FIGS. 2A-2E and discussed above. For example, the timing of various valve opening and closing events and the timing of various fuel-delivery events may differ from that shown in FIGS. 2B-2E. Additionally, engine controls 24 may cause other valve-opening events and/or other fuel-delivery events in addition to those shown in FIGS. 2B-2E. For example, in some embodiments and/or circumstances, engine controls 24 may open combustion-gas-recirculation valve 106 additional times during the power cycle to release combustion gas from combustion chamber 26. Furthermore, in some embodiments and/or circumstances, engine controls 24 may cause combustion of fuel in a lean manner, rather than a stoichiometric manner, leaving oxygen in the combustion gas directed through exhaust system 44 to the atmosphere.

Additionally, in some embodiments and/or circumstances, engine controls 24 may omit one or more of the strokes shown in FIG. 1 from a power cycle of engine 10 and/or cause additional strokes not shown in FIG. 1 during a power cycle of engine 10. For example, engine controls 24 may cause additional expansion and compression strokes between intake stroke 134 and first combustion-gas-expansion stroke 138 and/or additional expansion and compression strokes between first combustion-gas-expansion stroke 138 and exhaust stroke 144. In embodiments where engine controls 24 are operable to control valves 74, 100, 106 completely independently of motion of working member 14, engine controls 24 may vary the number of strokes from one power cycle to the next dependent upon various factors, such as the power output requested by an operator with operator interface 128. Additionally, in some embodiments and/or circumstances, engine controls 24 may cause engine 10 to execute a power cycle that omits second compression stroke 140 and second combustion-gas-expansion stroke 142.

It will be apparent to those skilled in the art that various modifications and variations can be made in the engine and methods without departing from the scope of the disclosure. Other embodiments of the disclosed engine and methods will be apparent to those skilled in the art from consideration of the specification and practice of the engine and methods disclosed herein. It is intended that the specification and examples be considered as exemplary only, with a true scope of the disclosure being indicated by the following claims and their equivalents.

What is claimed is:

1. A method of operating an engine having a housing with one or more combustion chambers, including a first combustion chamber, the engine also having a piston in fluid communication with the first combustion chamber, the method including:
   executing a power cycle in the first combustion chamber, including:
   combusting fuel in the first combustion chamber, thereby producing combustion gas that expands and drives the piston during a first combustion-gas-expansion stroke of the piston;
   compressing at least part of the combustion gas in the first combustion chamber during a compression stroke of the piston;
   between commencement of the first combustion-gas-expansion stroke and completion of the compression stroke, releasing part of the combustion gas from the first combustion chamber; and
   expanding at least part of the combustion gas against the piston during an additional combustion-gas-expansion stroke of the piston.

2. The method of claim 1, wherein releasing part of the combustion gas from the first combustion chamber between commencement of the first combustion-gas-expansion stroke and completion of the compression stroke includes releasing part of the combustion gas from the combustion chamber in a manner such that an effective compression ratio of the compression stroke is between about 8:1 and 20:1.

3. The method of claim 1, further including:
   recirculating the part of the combustion gas released from the first combustion chamber between commencement of the first combustion-gas-expansion stroke and the compression stroke through one or more subsequent power cycles in one or more of the combustion chambers.

4. The method of claim 1, wherein:
   releasing part of the combustion gas from the first combustion chamber between commencement of the first combustion-gas-expansion stroke and the compression stroke includes opening and closing one or more valves that are in fluid communication with the first combustion chamber, including controlling the effective compression ratio of the compression stroke by controlling the timing of closing the one or more valves during the compression stroke dependent at least partially upon one or more factors other than motion of the piston.

5. The method of claim 1, wherein:
   the combustion chamber includes a first portion disposed adjacent the piston, a second portion, and a necked portion connecting the first portion and the second portion; and
   the power cycle further includes, prior to combusting fuel in the combustion chamber, introducing charge gas into the combustion chamber and compressing the charge gas in the combustion chamber by the piston moving in a manner to reduce the volume of the first portion of the combustion chamber, whereby some of the charge gas is driven from the first portion of the combustion chamber, through the necked portion of the combustion chamber, into the second portion of the combustion chamber.

6. The method of claim 1, wherein executing the power cycle in the first combustion chamber further includes:
   subsequent to expanding at least part of the combustion gas against the piston during the additional combustion-gas-expansion stroke of the piston, releasing at least part of the combustion gas from the first combustion chamber into an exhaust system during an exhaust stroke of the piston, the exhaust system having one or more three-way catalysts through which the portion of the combustion gas released into the exhaust system flows; and
   causing the portion of the combustion gas that flows through the one or more three-way catalysts to have been subjected to substantially stoichiometric combustion prior to reaching the one or more three-way catalysts.

7. The method of claim 1, wherein executing the power cycle in the first combustion chamber further includes, after the first combustion-gas-expansion stroke, retaining at least part of the combustion gas in the combustion chamber and combusting additional fuel in the combustion chamber.

8. An engine, comprising:
   a housing having one or more combustion chambers, including a first combustion chamber;
   a working member disposed at least partially in the housing;
   an exhaust system; and
   engine controls operable to cause a power cycle in the first combustion chamber, the power cycle including
   combustion of fuel in the first combustion chamber, producing combustion gas that expands against and drives the working member a first time,
   release of a first portion of the combustion gas from the first combustion chamber,
   compression of at least a portion of the combustion gas in the first combustion chamber,
   expansion of at least a portion of the combustion gas against the working member again, whereby the working member is driven at least partially by that portion of the combustion gas again, and wherein the engine recirculates the first portion of the combustion gas to one or more of the combustion chambers without directing it through the exhaust system.

9. The engine of claim 8, further including:

one or more catalysts in the exhaust system;

wherein the power cycle further includes, subsequent to expansion of at least a portion of the combustion gas against the working member again, release of at least a portion of the combustion gas from the first combustion chamber into the exhaust system, wherein that portion of the combustion gas flows through the one or more catalysts;

wherein the engine controls are operable to cause the portion of the combustion gas that flows through the one or more catalysts to have been subjected to substantially stoichiometric combustion prior to reaching the one or more catalysts.

10. The engine of claim 8, wherein:

the combustion chamber includes a first portion disposed adjacent the working member, a second portion, and a necked portion connecting the first portion and the second portion;

the power cycle further includes, prior to combustion of fuel in the combustion chamber, introduction of charge gas into the combustion chamber and compression of the charge gas in the combustion chamber by the working member moving in a manner to decrease the volume of the first portion of the combustion chamber, thereby driving some of the combustion gas from the first portion of the combustion chamber, through the necked portion of the combustion chamber, into the second portion of the combustion chamber.

11. The engine of claim 8, wherein:

expansion of the combustion gas against the working member the first time occurs during a combustion-gas expansion stroke of the working member;

compression of at least a portion of the combustion gas in the combustion chamber occurs during a compression stroke of the working member; and the engine controls are operable to release the first portion of the combustion gas from the combustion chamber in a manner to cause an effective compression ratio of the compression stroke to be between about 8:1 and about 20:1.

12. The engine of claim 8, wherein the engine controls are operable to release the first portion of the combustion gas from the combustion chamber through one continuous discharge.

13. A method of operating an engine having a housing with one or more combustion chambers, including a first combustion chamber, the engine further including a working member, the method including:

executing a power cycle in the first combustion chamber, including
generating a first combustion event in the first combustion chamber, thereby producing combustion gas that expands against and drives the working member;
releasing a first portion of the combustion gas from the first combustion chamber,
compressing at least a portion of the combustion gas in the first combustion chamber,
generating a second combustion event in the first combustion chamber,
expanding at least a portion of the combustion gas in the first combustion chamber against the working member again, whereby the working member is driven again by that portion of the combustion gas, and
after the second combustion event, releasing gas from the combustion chamber into an exhaust system, the gas released into the exhaust system being closer to stoichiometric combustion products than the first combustion event is to stoichiometric combustion.

14. The method of claim 3, further including recirculating the first portion of the combustion gas through one or more additional power cycles in the one or more combustion chambers.

15. The method of claim 13, wherein releasing the first portion of the combustion gas from the first combustion chamber includes opening and closing one or more valves in fluid communication with the first combustion chamber, including timing the closing of the one or more valves dependent at least partially upon one or more factors other than motion of the working member.

16. The method of claim 13, further including:

directing at least a portion of the gas released into the exhaust system through one or more three-way catalysts to the atmosphere.

17. The method of claim 16, further including causing the gas directed through the one or more three-way catalysts to have been subjected to substantially stoichiometric combustion prior to reaching the one or more three-way catalysts.

18. The method of claim 17, wherein causing the gas directed through the one or more three-way catalysts to have been subjected to substantially stoichiometric combustion prior to reaching the one or more three-way catalysts includes combusting fuel in at least one of the first combustion chamber and the exhaust system subsequent to commencing compression of at least a portion of the combustion gas in the first combustion chamber.

* * * * *